(12) United States Patent
Lee et al.

(10) Patent No.: US 8,409,051 B2
(45) Date of Patent: Apr. 2, 2013

(54) PLANETARY GEAR SET FOR TRANSMISSION

(75) Inventors: Hyunku Lee, Seoul (KR); Hyunseung Suh, Seoul (KR); Moosuk Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 289 days.

(21) Appl. No.: 12/913,555

(22) Filed: Oct. 27, 2010

(65) Prior Publication Data

US 2011/0312467 A1 Dec. 22, 2011

(30) Foreign Application Priority Data

Jun. 18, 2010 (KR) .......................... 10-2010-0058138

(51) Int. Cl.
*F16H 57/08* (2006.01)
(52) U.S. Cl. ........................................................ 475/331
(58) Field of Classification Search .................. 475/162, 475/170, 169, 17, 182, 331, 344, 345, 346, 475/347, 180, 163; 74/640
See application file for complete search history.

(56) References Cited

U.S. PATENT DOCUMENTS

| 5,123,300 | A * | 6/1992 | Himmelein et al. ............ 74/640 |
| 6,231,468 | B1 * | 5/2001 | Bajulaz ......................... 475/166 |
| 2007/0068481 | A1 | 3/2007 | Campbell |
| 2007/0101820 | A1 | 5/2007 | Bulatowicz |

FOREIGN PATENT DOCUMENTS

| JP | 63-235747 A | 9/1988 |
| JP | 7-332442 A | 12/1995 |
| JP | 2000-2306 A | 1/2000 |
| JP | 2005-265151 A | 9/2005 |
| KR | 2003-0070005 A | 8/2003 |
| KR | 10-2005-0108491 A | 11/2005 |
| KR | 10-2009-0064092 A | 6/2009 |
| KR | 10-2010-0023345 A | 3/2010 |

* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A planetary gear set for a transmission may include a sun gear, a carrier, and a ring gear, wherein an inner circumference of the ring gear is formed in an ellipse shape.

6 Claims, 7 Drawing Sheets

PLANETARY GEAR SET FOR TRANSMISSION

CROSS-REFERENCE TO RELATED APPLICATIONS

The present application claims priority to Korean Patent Application Number 10-2010-0058138 filed Jun. 18, 2010, the entire contents of which application is incorporated herein for all purposes by this reference.

BACKGROUND OF THE INVENTION

1. Field of the Invention

The present invention relates to a planetary gear set for a transmission, and more particularly, to a technology of reducing noise generated from a planetary gear set, which are widely used in automatic transmissions.

2. Description of Related Art

FIG. 1 is a cross-sectional view showing the structure of an automatic transmission of the related art, in which torque is supplied from a torque converter 500 to a plurality of planetary gear sets 504 through a input shaft 502 and power is produced at various gear ratio generated by the planetary gear sets 504 and supplied to the driving wheels of a vehicle, by selectively operating a plurality of friction-driven elements.

In the automatic transmission having this configuration described above, planetary gear set 504 is composed of a sun gear, a carrier, and a ring gear, in which the carrier functions as an element that controls power input and output of planetary gear set 504 while providing shafts for pinion gears revolving and rotating between the sun gear and the ring gear.

Planetary gear set 504 generates noise in the operation, particularly, large noise is generated due to bad engagement and contact between the gears of planetary gear set 504.

It is difficult to set and maintain the size of the ring gear, pinion gear, and carrier such that all of the pinion gears is closely engaged with the ring gear at one time, in consideration the assemblage of planetary gear set 504.

That is, it is difficult to insert the carrier, with the pinion gears engaged with the ring gear, such that it is required to provide an assembly tolerance for smooth assembly, when the ring gear, pinion gears, and carrier are manufactured such that the carrier equipped with the pinion gears is inserted inside the ring gear and the pinion gears can be inserted in complete engagement at a plurality of positions of the ring gear.

However, the assembly tolerance described above makes it easy to combine the ring gear with the pinion gears, but it is difficult to maintain accurate and appropriate engagement between all the teeth of the ring gear and the pinion gears in the operation after they are combined. Therefore, the contact state between some teeth is deteriorated and this is a cause generating noise in the operation of planetary gear set 504, when rotation is made by large torque.

That is, as shown at the left side of FIG. 2, when a ring gear R and a pinion gear P are assembled with an assembly tolerance, the engagement between pinion gear P and ring gear R is deteriorated in large-torque rotation, as shown at the right side, which becomes a main cause for operational noise of planetary gear set 504.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a planetary gear set for a transmission that can be easily assembled with transmissions, such as an automatic transmission, smoothly transmit power and considerably reduce noise, by ensuring appropriate engagement between a ring gear and pinion gears during operation, after the assembly is completed.

In an aspect of the present invention, the planetary gear set for a transmission may include a sun gear, a carrier, and a ring gear, wherein an inner circumference of the ring gear may be formed in an ellipse shape.

The length of a short axis of the ellipse shape made by the inner circumference of the ring gear may be smaller than the length of a long axis thereof such that at least a pinion gear mounted on the carrier may be optimally engaged with the ring gear, and the length of the long axis of the ellipse shape made by the inner circumference of the ring gear may be larger than the length of the short axis such that the carrier and the pinion gears may be smoothly assembled in the ring gear.

The roundness of the elliptical inner circumference of the ring gear may be in the range of between approximately 50 μm and approximately 500 μm.

In another aspect of the present invention, the planetary gear set for a transmission may include a sun gear; a ring gear coaxially arranged with the sun gear; at least a pinion gear disposed between the sun gear and the ring gear; and a carrier coaxially arranged with the sun gear and providing rotational shafts for the at least a pinion gear, wherein the ring gear has: a center retaining portion disposed on a short axis thereof and having a short distance from a center of the ring gear, wherein the center retaining portion includes a relatively large curvature with a first predetermined angle with respect to the center of the ring gear such that the center of the carrier may be retained in alignment with the center of the ring gear by tightly engaging the ring gear with the at least a pinion gear therein; and an assembly improving portion extending from an end of the center retaining portions, having a large distance from the center of the ring gear, and disposed at an opposite side of the short axis, wherein the assembly improving portion includes a relatively small curvature with a second predetermined angle with respect to the center of the ring gear, such that the ring gear may be smoothly assembled with the pinion gears therein.

The first predetermined angle may be larger than second predetermined angle.

The center retaining portions and the assembly improving portions may be alternately formed along the inner circumference of the ring gear, such that the ring gear has an elliptical shape.

The roundness of the ring gear may be in the range of 50 μm to 500 μm.

According to the exemplary embodiments of the present invention, a planetary gear set for a transmission can be easily assembled with transmissions, such as an automatic transmission, smoothly transmit power and considerably reduce noise, by ensuring appropriate engagement between a ring gear and pinion gears during operation, after the assembly is completed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
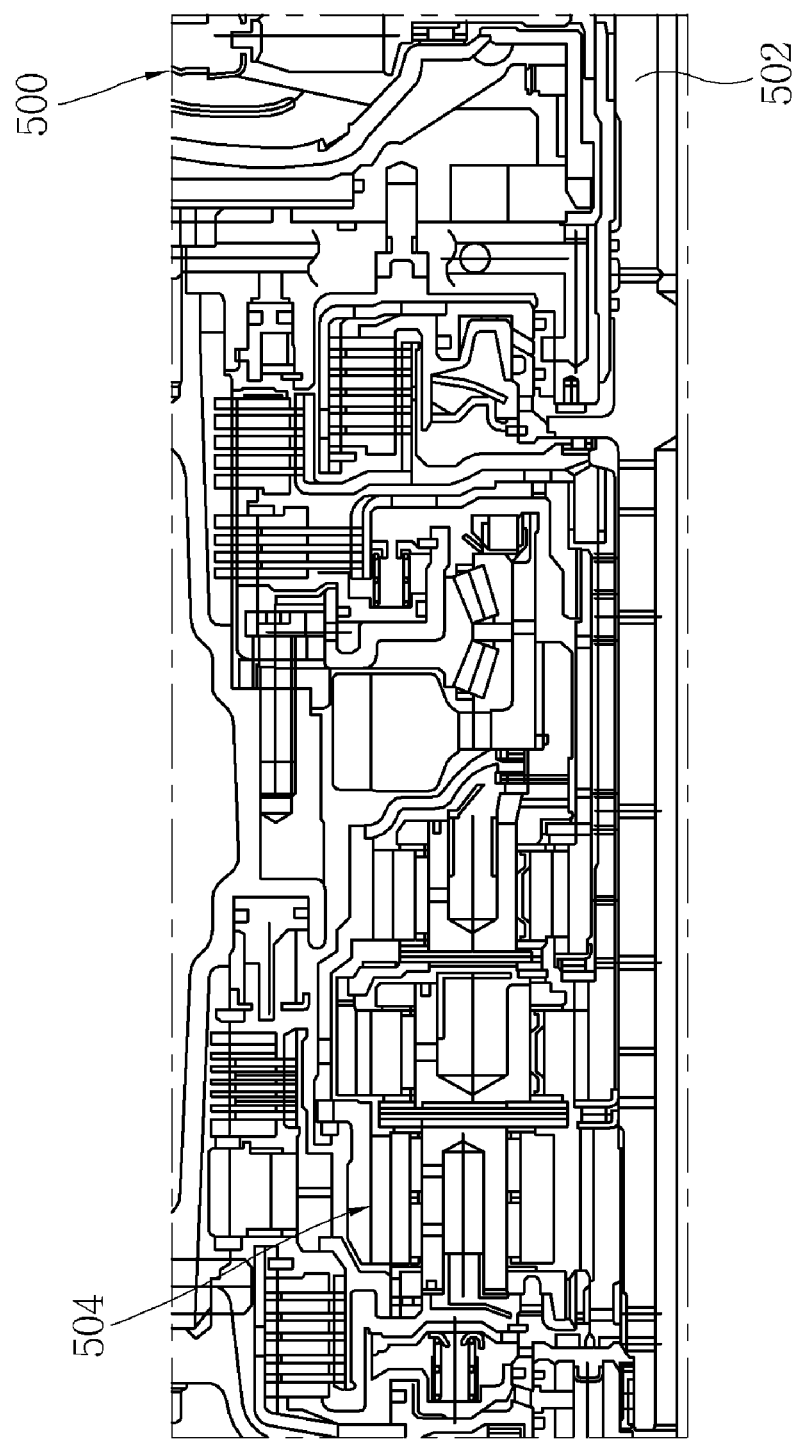
FIG. 1 is a view showing an example of the structure of an automatic transmission according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
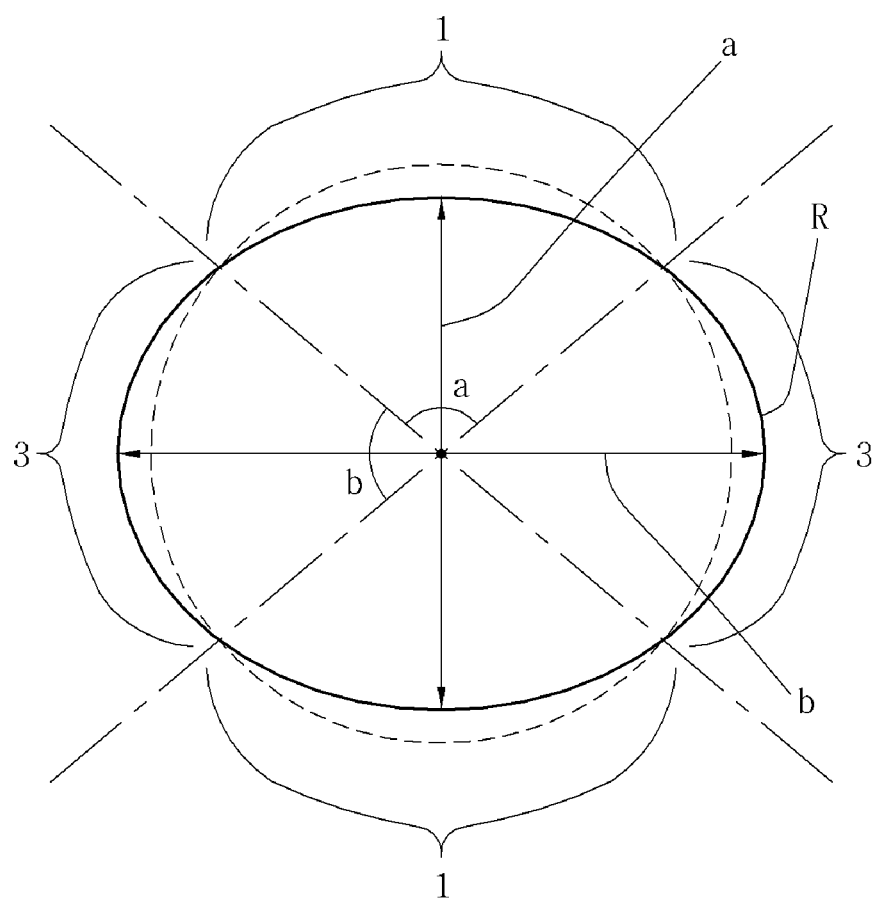
FIG. 3 is a view illustrating the structure of a ring gear according to an exemplary embodiment of the present invention.
Figure 4:
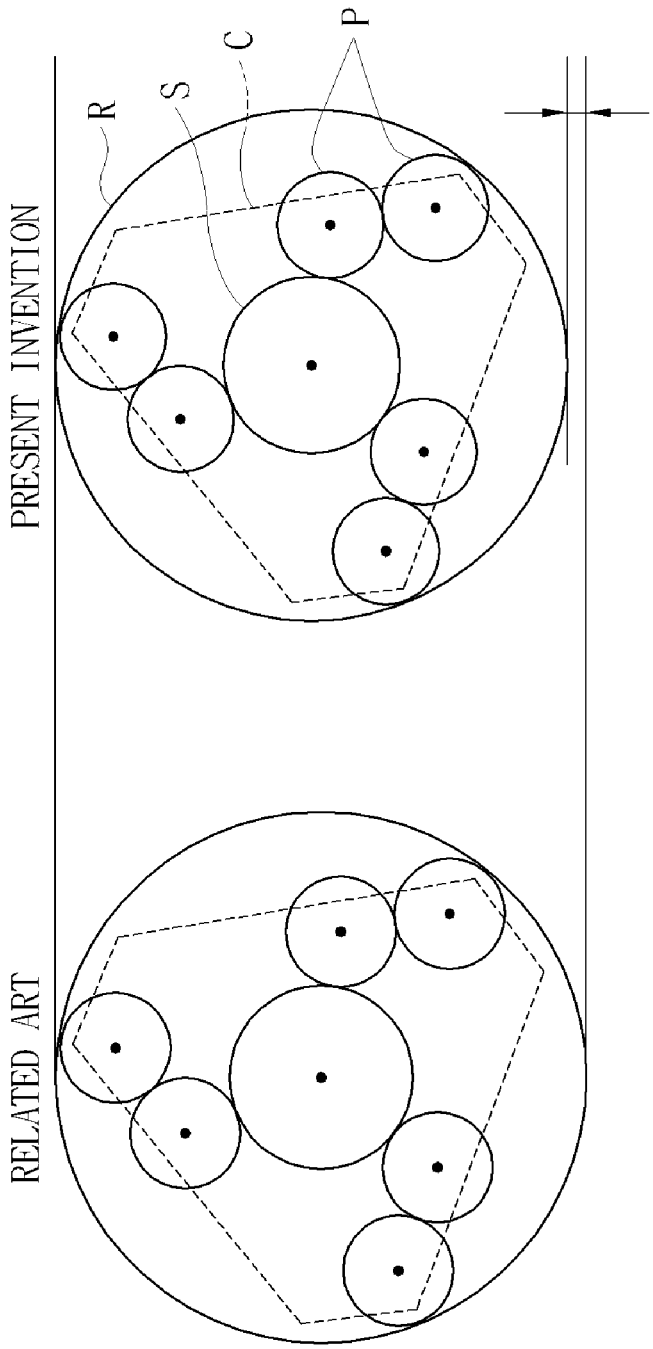
FIG. 4 is a view comparing a common planetary gear set of the related art with a planetary gear set according to an exemplary embodiment of the present invention.
Figure 5:
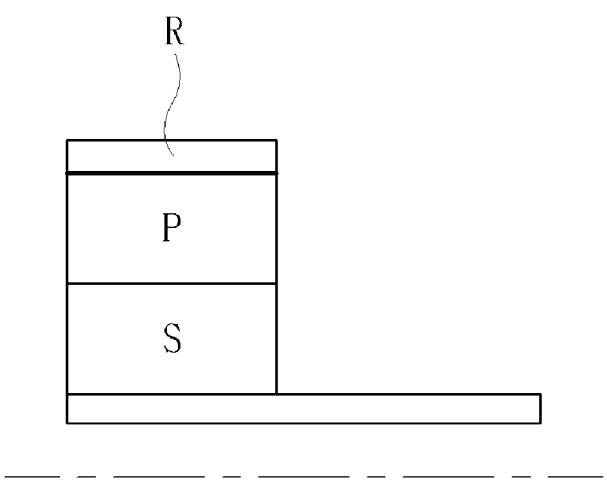
FIG. 5 is a view illustrating engagement between the short-axial portion of a ring gear and a pinion gear, which is shown at the left side of FIG. 2, according to an exemplary embodiment of the present invention.

Referring to FIGS. 3 to 5, a planetary gear set according to an exemplary embodiment of the present invention includes a sun gear S, a carrier C, and a ring gear R, in which the inner circumference of ring gear R is formed in an ellipse.

The length of the short axis 'a' of the ellipse made by the inner circumference of ring gear R is smaller than the length of the long axis 'b' such that pinion gears P supported by carrier C are optimally engaged with ring gear R, while the length of the long axis 'b' of the ellipse made by the inner circumference of ring gear R is larger than the length of the short axis 'a' such that carrier C and pinion gears P can be smoothly inserted in ring gear R.

That is, the portions toward the short axis 'a' of ring gear R are formed to ensure tight engagement with pinion gears P and the portions toward the long axis 'b' of ring gear R are formed to easily insert pinion gears P into ring gear R while ensuring easy assembly.

Figure 2:
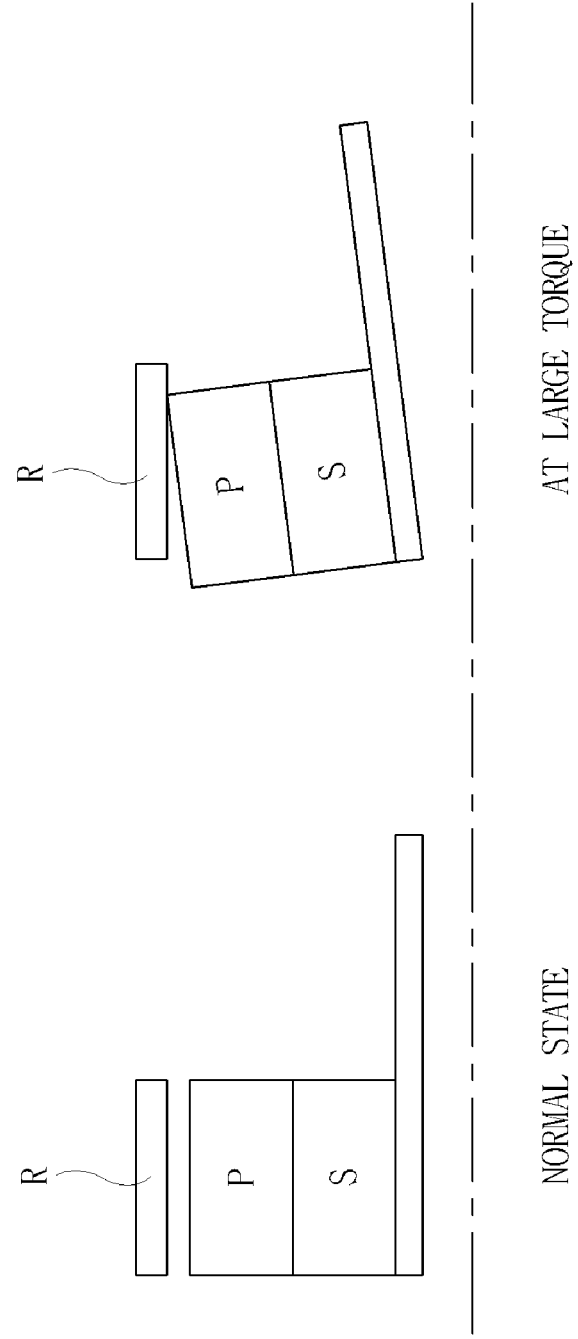
FIG. 2 is a view illustrating a problem in the related art.

For reference, FIG. 5 shows tight engagement between ring gear R and pinion gear P, in comparison with FIG. 2.

It is preferable that the inner circumference of ring gear R has roundness between 50 µm and 500 µm in a planetary gear set used for common transmissions of vehicles.

Although it is possible to manufacture ring gear R first to have an elliptical shape such that only the inner circumference has an elliptical shape, it is possible to achieve an elliptical ring gear R in a simpler and inexpensive method, by performing a process of forming a circle that forms ring gear R in a real circle and a process of pressing that presses ring gear R having a rear circle shape into an elliptical shape with a press.

That is, a ring gear is manufactured first by the same method as the existing common ring gears and then is pressed in an elliptical shape by a press, as described above.

Figure 6:
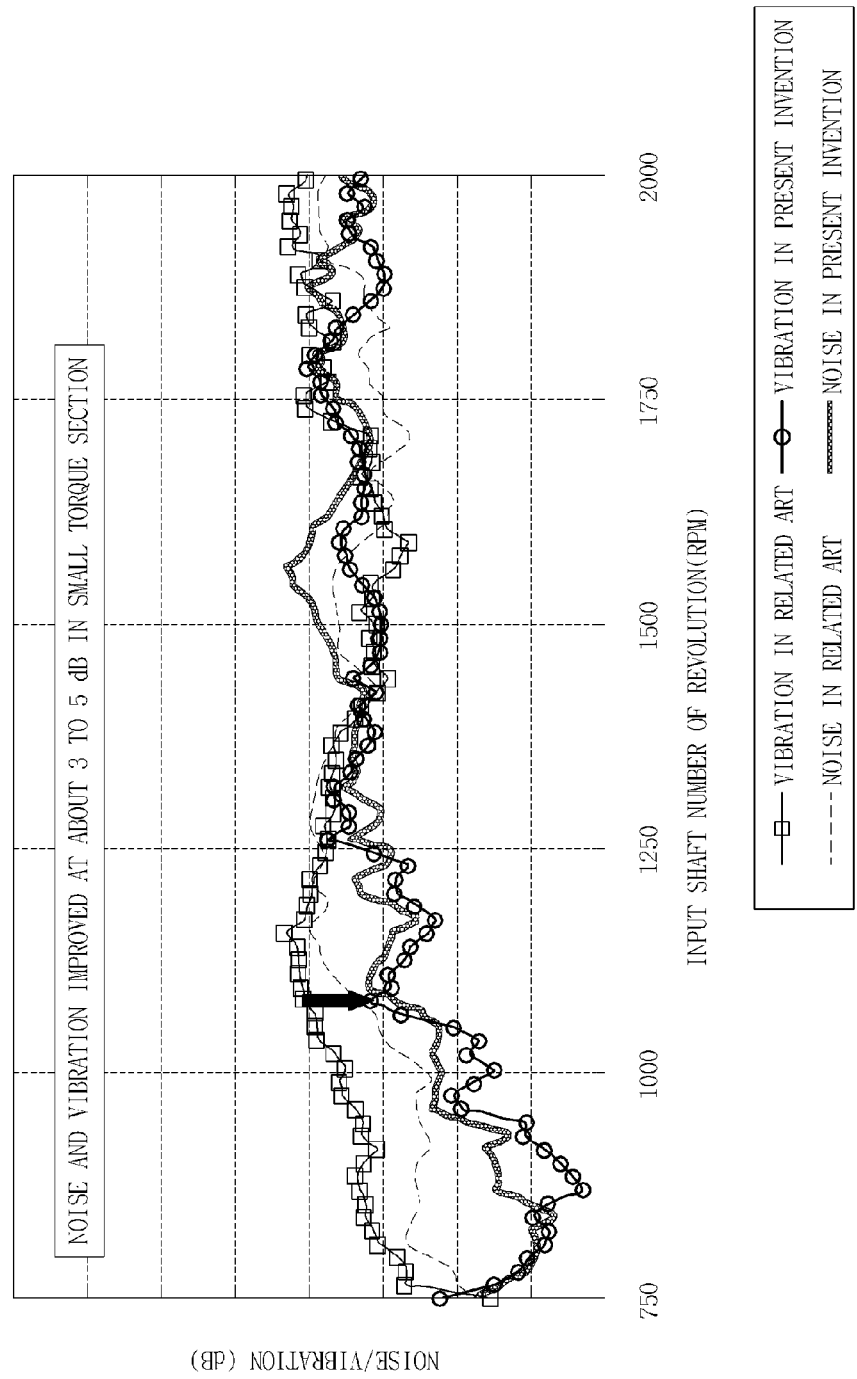
FIG. 6 is a graph comparing noise and vibration features to rotational speed of in input shaft at a small torque of an automatic transmission equipped with a planetary gear set according to an exemplary embodiment of the present invention with those of the related art.
Figure 7:
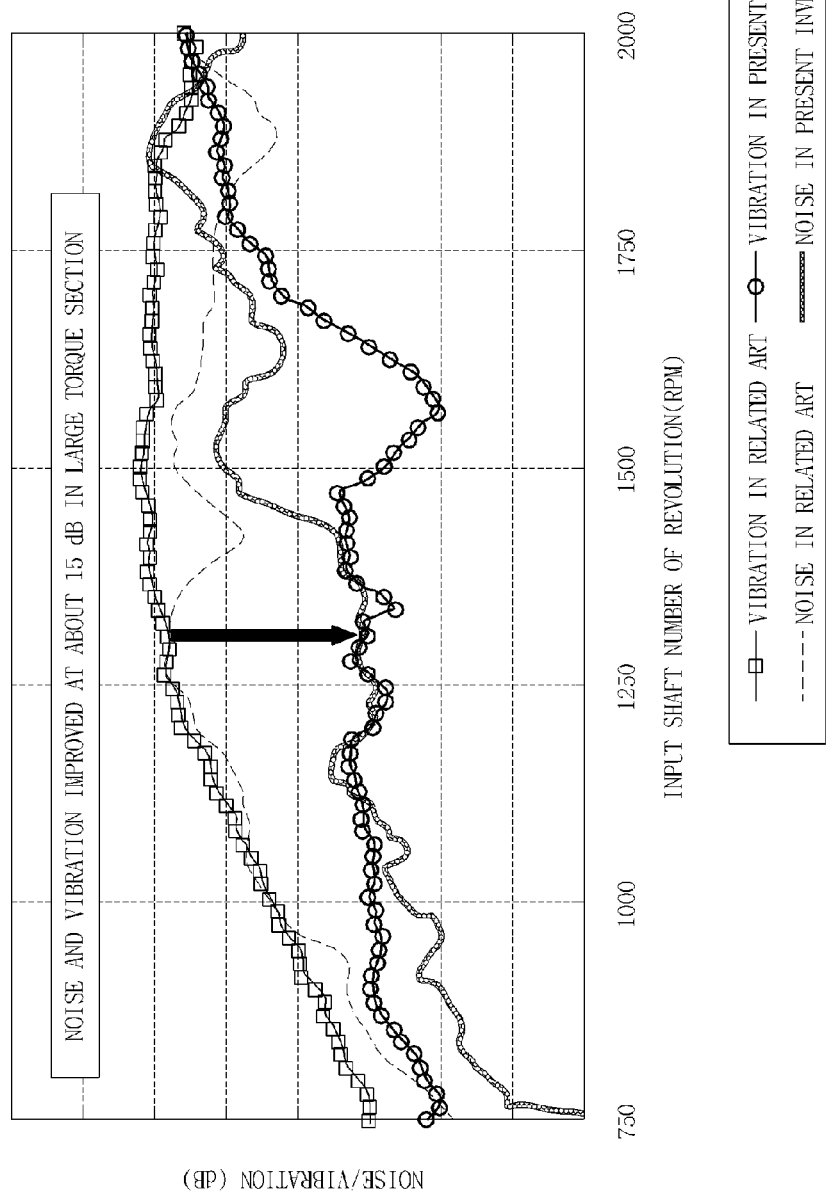
FIG. 7 is a graph comparing noise and vibration features to rotational speed of in input shaft at a large torque of an automatic transmission equipped with a planetary gear set according to an exemplary embodiment of the present invention with those of the related art.

The noise and vibration features generated at various RPMs of the input shaft in a transmission equipped with the planetary gear set having the above configuration are compared with those of a circular ring gear R of the related art in FIGS. 6 and 7. FIG. 6 is a result in a relatively small torque section, which shows improvement of about 3 to 5 dB and FIG. 7 is a result in a relatively large torque section, which shows improvement of about 15 dB.

Obviously, the improvement in the noise and vibration is because the engagement between ring gear R and pinion gears P is continuously appropriated maintained by ensuring tight engagement between the short-axial portions of ring gear R and pinion gears P. Further, this state restrains a stable position of the rotational center of carrier C providing rotational shafts for pinion gears P, without shaking at the rotational center of ring gear R, such that it is possible to ensure smooth and stable operability and improve durability of the planetary gear set.

Meanwhile, the exemplary embodiment of the present invention described above can be described as follows.

That is, an exemplary embodiment of the present invention provides a planetary gear set including a sun gear S, a ring gear R coaxially arranged with sun gear S, a plurality of pinion gears P disposed between sun gear S and ring gear R, and a carrier C coaxially arranged with sun gear S and providing rotational shafts for pinion gears P, in which ring gear R has center retaining portions 1, which have a short distance from the center of ring gear R and a relatively large curvature with a predetermined angle a about the center of ring gear R such that the center of carrier C is retained in alignment with the center of ring gear R by tightly engaging ring gear R with pinion gears P, and an assembly improving portions 3 that is disposed at the opposite sides from the center retaining portions 1 between center retaining portions 1, and have a relative large distance from the center of ring gear R and a relatively small curvature with a predetermined angle b about the center of ring gear R such that ring gear R is smoothly engaged with pinion gears P.

Center retaining portions 1 and assembly improving portions 3 are alternately formed along the circumference of ring gear R, such that ring gear R has an elliptical shape.

Obviously, the roundness of ring gear R is preferably in a range of 50 µm to 500 µm. Further, in the manufacturing method, it is possible to more easily manufacture ring gear R by performing a process of forming a circle that forms ring gear R in a real circle and a process of pressing that presses ring gear R having a rear circle shape into an elliptical shape with a press.

That is, the portions on the short axis 'a' of the ellipse of ring gear R correspond to center retaining portions 1 and the portions on the long axis 'b' of the ellipse correspond to assembly improving portions 3.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear set for a transmission comprising a sun gear, a carrier, and a ring gear coaxially arranged with a center of the sun gear, wherein an inner circumference of the ring gear is formed in an ellipse shape;
   wherein the length of a short axis of the ellipse shape made by the inner circumference of the ring gear is smaller than the length of a long axis thereof such that at least a pinion gear mounted on the carrier is engaged with the ring gear through the short axis; and
   wherein the length of the long axis of the ellipse shape made by the inner circumference of the ring gear is larger than the length of the short axis such that the carrier and the pinion gears are assembled in the ring gear.

2. The planetary gear set for the transmission as defined in claim 1, wherein the roundness of the elliptical inner circumference of the ring gear is in the range of between approximately 50 μm and approximately 500 μm.

3. A method of manufacturing the planetary gear set as defined in claim 1, the method comprising:
   a process of forming a circular ring gear; and
   a process of pressing to press the ring gear having a circular shape into an elliptical shape with a press.

4. A planetary gear set for a transmission comprising;
   a sun gear;
   a ring gear coaxially arranged with a center of the sun gear;
   at least a pinion gear disposed between the sun gear and the ring gear; and
   a carrier coaxially arranged with the sun gear and providing rotational shafts for the at least a pinion gear,
   wherein the ring gear has:
      a center retaining portion disposed on a short axis thereof and having a short distance from a center of the ring gear, wherein the center retaining portion includes a relatively large curvature with a first predetermined angle with respect to the center of the ring gear such that the center of the carrier is retained in alignment with the center of the ring gear by tightly engaging the ring gear with the at least a pinion gear therein; and
      an assembly improving portion extending from an end of the center retaining portions, having a large distance from the center of the ring gear, and disposed at an opposite side of the short axis, wherein the assembly improving portion includes a relatively small curvature with a second predetermined angle with respect to the center of the ring gear, such that the ring gear is smoothly assembled with the pinion gears therein;
   wherein the first predetermined angle is larger than second predetermined angle; and
   wherein the center retaining portions and the assembly improving portions are alternately formed along the inner circumference of the ring gear, such that the ring gear has an elliptical shape.

5. The planetary gear set for the transmission as defined in claim 4, wherein the roundness of the ring gear is in the range of 50 μm to 500 μm.

6. A method of manufacturing the planetary gear set as defined in claim 4, the method comprising:
   a process of forming a circular ring gear; and
   a process of pressing to press the ring gear having a circular shape into an elliptical shape with a press.

* * * * *